United States Patent [19]

Bhagwat et al.

[11] 4,376,296
[45] Mar. 8, 1983

[54] DC-SIDE COMMUTATED INVERTER

[75] Inventors: Pradeep M. Bhagwat, Baltimore, Md.; Victor R. Stefanovic, Columbia, Mo.

[73] Assignee: Canadian Patents & Dev. Ltd., Ottawa, Canada

[21] Appl. No.: 239,383

[22] Filed: Mar. 2, 1981

[51] Int. Cl.³ .................... H02M 1/06; H02M 7/515
[52] U.S. Cl. .................................. 363/138; 363/58; 363/136
[58] Field of Search .............. 363/57, 58, 96, 135, 363/136, 137, 138

[56] References Cited

U.S. PATENT DOCUMENTS 3,321,697  5/1967  Etter ............................. 363/135
3,388,310  6/1968  Etter ............................. 363/135
3,916,287 10/1975  Brenneisen et al. .......... 363/57
3,940,669  2/1976  Tsuboi et al. ................. 363/137

Primary Examiner—William M. Shoop
Assistant Examiner—Peter S. Wong
Attorney, Agent, or Firm—Edward Rymek

[57] ABSTRACT

The inverter may be single phase with one inverter leg or N-phase with N inverter legs for connection across a DC source. Each leg includes a pair of series connected thyristors with a terminal between the thyristors for connection to a load. In addition, each thyristor has a diode connected in reverse polarity across it. A commutation circuit which includes an inductor in series with the inverter legs and a capacitor in parallel with the inductor and the inverter legs, provides a commutation pulse to turn off the thyristors in each leg. A further isolating inductor is connected at the DC power input to the inverter, and a reverse polarity feedback diode may be connected across it.

4 Claims, 4 Drawing Figures

DC-SIDE COMMUTATED INVERTER

BACKGROUND OF THE INVENTION

This invention is directed to a thyristor inverter and in particular to a DC-side commutated inverter.

Presently, there are many different commutation circuits used in thyristor choppers and inverters. One of the most commonly used circuits is the McMurray inverter described in U.S. Pat. No. 3,207,974 which issued on Sept. 21, 1965 to W. McMurray. This inverter is distinguished by a high efficiency, a small number of components, a high power/weight ratio and short clearing times. However, this type of inverter requires one commutation circuit for each phase, is very sensitive to switching noise and has to rely on fuse protection in case of a shoot-through. In an attempt to conceptually simplify inverter structures a new class of DC-side commutated inverters has been developed over the past ten years. This inverter class is characterized by a single commutation circuit connected across a DC (i.e. input) bus, which, in most cases, initiates the commutation by diverting the load current away from the inverter and into the commutation circuit.

A refined version of this concept is described in the publication—"Current Source Double DC-Side Forced Commutated Inverter," IEEE Transactions Industry Applications, Vol. 1A-14, no. 6, November/December 1978, pp 581–593, by S. Martinez and F. Aldana. This inverter consists of a basic McMurray circuit together with current limiting inductances across a DC bus to obtain an input commutated inverter. Thus, at every commutation cycle, all inverter thyristors are turned off, allowing a greater flexibility in programming the output voltage waveforms. However, the type of inverter still has shoot-through problems and requires a large number of thyristors and diodes.

SUMMARY OF THE INVENTION

It is therefore an object of this invention to provide a novel, reliable inverter having fewer components in which shoot-through problems are eliminated.

This and other objects are achieved in a single phase or N-phase inverter for providing AC power to a load wherein the inverter has one or N inverter legs connected to input lines for connection to a DC source. Each inverter leg includes a pair of thyristors in series, an output terminal between the thyristors, and a diode connected in reverse direction across each thyristor. The inverter further includes a commutation circuit which has inductance and capacitance, and an isolating inductance circuit at the input lines of the inverter. The N-phase inverter may have a single commutation circuit for all phases, or each of the N-inverter legs may have a commutation circuit to form N single phase inverters. In all cases, the commutation inductance is in series with the inverter leg or legs and the commutation capacitance is across the commutation inductance and inverter legs to provide a commutation pulse to turn off the thyristors in all of the inverter legs.

The isolation inductance may consist of an isolation inductor connected in series in an input line between the commutation circuit and the DC source and a feedback diode connected in reverse polarity across the inductor. However, for single phase inverters or for an N-phase inverter which is made up of single phase inverters, it may be preferred that the isolation inductance consists of a first coupling inductor in series with a feedback diode across the input lines, and a coupling inductor in each of the single-phase inverters, magnetically coupled to the first coupling inductor.

Many other objects and aspects of the invention will be clear from the detailed description of the drawings.

IN THE DRAWINGS

DETAILED DESCRIPTION

Figure 1:
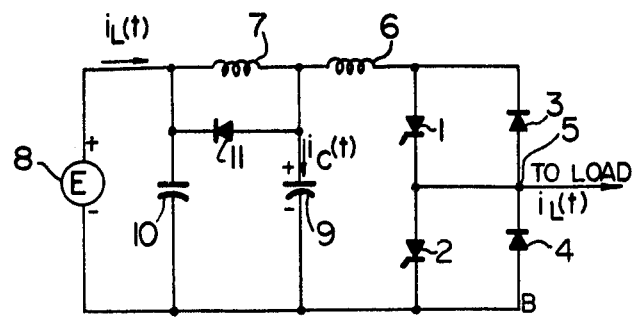
FIG. 1 illustrates a single phase inverter in accordance with the present invention.

The basic inverter in its single phase form in accordance with this invention is illustrated in FIG. 1. The inverter consists of two thyristors 1 and 2 with their feedback diodes 3 and 4. The load is connected to junction 5 between the thyristors 1 and 2. The circuit further includes a commutation inductor 6 and an isolating inductor 7 connected in series between a DC source 8 and the thyristors 1 and 2. A commutation capacitor 9 is connected across the inductor 6 and the thyristors 1 and 2. A filter capacitor 10 may be connected across the DC source 8 if required. A free-wheeling feedback diode 11 may also be connected in the reverse direction across the isolating inductor 7.

Figure 2:
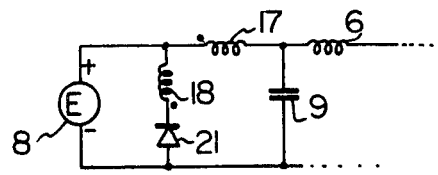
FIG. 2 illustrates an alternate isolation inductance circuit for use in the present inverter.

Instead of the inductor 7 and diode 11, the coupled inductance scheme illustrated in FIG. 2 may be used as the isolation inductance circuit to recycle the inductor energy back to the source 8. This isolation inductor circuit includes a first coupling inductor 17 which is connected in series with the commutation inductor 6 and which is magnetically coupled to a second coupling inductor 18. Inductor 18 with a feedback diode 21 is connected across the source 8.

Figure 3:
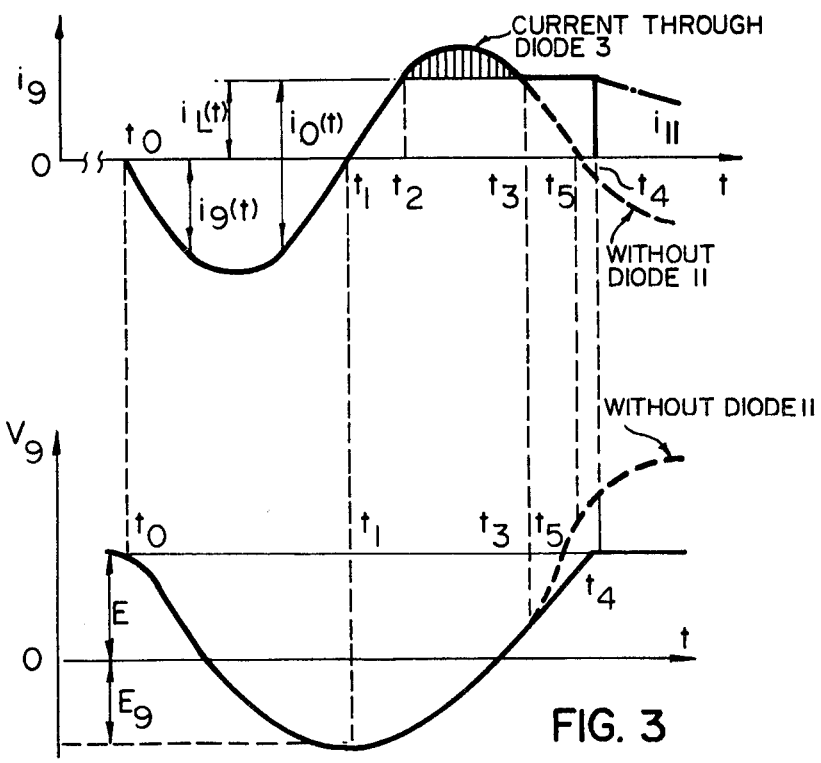
FIG. 3 illustrates the commutating inductance current and capacitance voltage during the commutation cycle.

Reference is made to FIG. 3 to describe the commutation cycle of the inverter in accordance with the present invention. Consider thyristor 1 conducting, supplying a current $i_L(t)$ to a load which may be predominantly inductive. The commutation cycle is initiated at $t=t_0$, FIG. 3, by triggering thyristor 2, thus deliberately causing a shoot-through. As a result, a ringing loop, consisting of capacitor 9, inductor 6 and thyristors 1 and 2, is established and capacitor 9 starts to discharge. This adds an oscillating component $i_9(t)$ to the load current $i_L(t)$ already flowing through inductor 7. During period $t_0-t_1$, FIG. 2, the current through inductor 6 and thyristor 1 is:

$$i_0(t) = i_L(t) + i_9(t) \quad (1)$$

At $t=t_1$, $i_9(t)$ reverses so that the current through inductor 6 and thyristor 1 becomes:

$$i_0(t) = i_L(t) - i_9(t) \quad (2)$$

As soon as the current through thyristor 1 falls below the load current $i_L(t)$ at time $t=t_1$, diode 4 starts to conduct so as to maintain the constant load current. During the period $t_1-t_3$, the current $i_4(t)$ through diode 4 is:

$$i_4(t) = i_9(t) \quad (3)$$

The conduction of diode 4 commutates thyristor 2. At $t=t_2$, the entire load current $i_L(t)$ is supplied through diode 4 and the current through thyristor 1 becomes zero. Since the ringing current $i_9(t)$ continues to increase, diode 3 starts conducting, providing a reverse bias across the thyristor 1 which commutates it. During the period $t_2-t_3$, the current $i_3$ through diode 3 is:

$$i_3 = i_9(t) - i_L(t) \tag{4}$$

The available turn-off time for thyristor 1 is:

$$t_q = t_3 - t_2 \tag{5}$$

At $t=t_3$ the current through diode 4 becomes again equal to the load current and the current through diode 3 and inductor 6 becomes zero. The commutation cycle is now finished and the load current continues to freewheel through diode 4. During the $t_3-t_4$ period, capacitor 9 is charged with a quasi-constant current $i_L(t)$, supplied by inductor 7. Inductor 7 must be sufficiently large to limit the current rise during a commutation-induced shoot-through. Thus, inductor 7 should effectively isolate the voltage source 8 from the rest of the circuit during each commutation cycle.

At $t=t_4$ the voltage across the capacitor 9 becomes equal to the source 8 voltage E and diode 11 starts to conduct, providing a free-wheeling path for the current in inductor 7. This prevents damping of all magnetic energy stored in inductor 7 on capacitor 9, which would force the capacitor voltage significantly above the source voltage E as shown in FIG. 3.

Commutation of thyristor 2, i.e. commutation with a negative load current, is initiated by triggering thyristor 1. The process is analogous to that described for thyristor 1 and the capacitor current and voltage waveforms are the same as those presented in FIG. 3.

The resonant frequency of the inductor 6-capacitor 9 circuit is selected to provide a sufficient thyristor turn-off time, $t_q$, for a maximum anticipated load current $i_L(t)$. Additionally, inductor 6 has to provide di/dt protection for both thyristors 1 and 2. As the diode 3 stops conducting, the re-applied voltage across thyristor 1 jumps to the value of the capacitor 9 voltage at this instant. After that, during the period when the commutation capacitor 9 is charged with a constant current, the thyristor voltage follows the linear rise in the capacitor voltage. The capacitor voltage never exceeds the source voltage E due to the free-wheeling action of diode 11.

N-phase operation may be obtained by using N separate single phase circuits of the type described in FIG. 1. However, the efficiency of the inverter so obtained would be low due to the loss of all energy trapped in the isolating inductor 7 at the end of each commutation cycle unless the inductor coupled scheme for the isolation inductance circuit illustrated in FIG. 2 is used. In an N-phase inverter having a commutation circuit for each phase, a single inductor 18 with its diode 21 would be connected across the source 8. At the same time, inductor 18 would be connected and coupled to an inductor 17A, 17B, ... 17N in each of the N-phase of the inverter. However, in view of the number of components required, N-phase inverter operation of the type described in FIG. 4 would be preferred.

Figure 4:
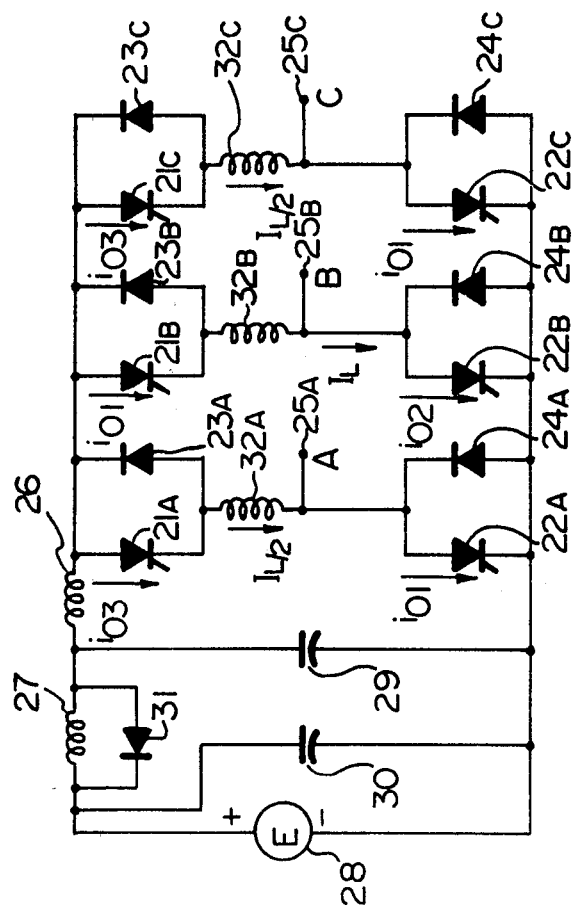
FIG. 4 illustrates a three-phase inverter in accordance with the present invention.

FIG. 4 illustrates a 3-phase inverter having a single commutation circuit. The inverter includes three identical inverter legs A, B, and C, each including a pair of thyristors 21A-22A, 21B-22B, 21C-22C, respectively, with diodes 23A-24A, 23B-24B, 23C-24C, reverse connected across the thyristors. Each of the legs A, B, and C, further include identical inductors 32A, 32B, 32C, respectively, connected in series between the thyristors in the respective legs. The outputs 24A, 25B, 25C, to the load are taken from the same side of each inductor 32A, 32B, and 32C, or from mid-taps on the inductors 32A, 32B, 32C. One set of commutation elements are common to all three legs and are connected across the inverter legs A, B and C and the DC source 28. The commutation elements include the commutation inductor 26 and the commutation capacitor 29. A further isolation inductor 27 with its freewheeling diode 31 may be included in the inverter as well as a filter capacitor 30.

The operation of the circuit is basically the same as the inverter in FIG. 1, with the series inductors 32A, 32B, 32C providing current sharing during each commutation cycle. At any one time, three of the thyristors will have to be commutated. As an example, if thyristors 21A, 22B and 21C are conducting, the commutation cycle is initiated by triggering thyristors 22A, 21B and 22C, thus causing shoot-through in each inverter leg A, B and C. The capacitor current $i_{29}$ rings around just as in the case of a single phase inverter, dividing into components for each of the three inverter legs. During the first half of the commutation cycle (period $t_0-t_1$, FIG. 3), the current through the thyristors which are triggered to start the commutation, in this case thyristors 22A, 21B and 22C, is:

$$i_{o1}(t) = i_{29}(t)/3 \tag{6}$$

while the currents $i_{o2}$ through thyristor 22B and $i_{o3}$ through thyristors 21A and 21C are:

$$i_{o2}(t) = i_L(t) + i_{29}(t)/3 \tag{7}$$

$$i_{o3}(t) = i_L(t)/2 + i_{29}(t)/3 \tag{8}$$

During the second half of the commutation cycle, $t_1-t_4$, FIG. 3, each of the feedback diodes 24A, 23B and 24C carries one third of the capacitor current. The diodes 23A and 23C start to conduct when the capacitor current becomes $i_{29}(t)/3 = i_L(t)/2$. The diode 24B starts to conduct when $i_{29}(t)/3 = i_L(t)$. Thus the thyristor 22B is the last one to be turned-off, having at the same time the shortest available commutation time. The process is analogous for any other combination of conducting thyristors. Note that the effective commutation inductance is:

$$L = L_{26} + L_{32}/3 \tag{9}$$

The inductance of inductor 26 is chosen to provide di/dt protection under all possible conditions. With a very reliable triggering circuit, which ensures that all triggered thyristors turn-on at the same time, inductor 26 can be eliminated and the commutation inductance is distributed between the three inverter legs. In this case:

$$L_{32} = 3L_{26} \tag{10}$$

The most important difference between having one commutation circuit per phase, shown in FIG. 1, and sharing one commutation circuit among all three phases, shown in FIG. 4, is in the use of magnetic energy stored in the isolating inductor 27 at the end of each commutation cycle. Instead of dissipating this energy through a free-wheeling action, the energy is re-routed to the load the moment the next set of thyristors is triggered. Assuming for the moment that there is no rise in the current through inductor 27 during commutation, the free-wheeling diode 32 will conduct only until the next set of thyristors is fired. After that, the current flowing through inductor 27 will be re-routed to the load. In fact, the inverter may be viewed as a power multiplexer, which connects various phases of the load to the inductor 27, in a manner analogous to a current source inverter.

From the description of the commutation process, it is obvious that the proposed circuit has an auto-recovery from shoot-throughs. Consider a three-phase operation, FIG. 3, and assume for the moment that all current sharing inductors $L_{32}$ are zero. Suppose now that a thyristor 22A is accidently fired while thyristor 21A is conducting. This represents a shoot-through which automatically starts a commutation cycle, with capacitor 29 discharging through thyristors 21A and 22A. The capacitor current will have the same peak value and the same period as during normal commutation. However, since all commutation current is flowing through one inverter leg, the current pulse through thyristor 21A and 22A is three times its normal value. During the second portion of the commutation cycle, period $t_1-t_4$, FIG. 2, all feedback diodes conduct and the current is divided between all three legs, just as during a normal commutation.

For adequate short circuit protection, the load current should be monitored and the off-thyristors fired to commutate the thyristors when a short circuit is detected. Alternately, the capacitor voltage should be monitored and the triggering pulses stopped if the voltage changes polarity outside a normal commutation cycle. Once all thyristors are turned off, an appropriate controller may re-start the inverter after a given delay following the short circuit. Finally, the controller could make a specified number of re-start attempts before shutting down the inverter. Notes that the fuseless protection becomes ineffective in the case of a component failure. For this reason, fuses must still be provided with this inverter.

The values for the commutation capacitance $C_c$, the commutation inductance $L_c$, and the isolation inductance $L_i$, for the inverters described, may be determined by the following expressions:

$$C_c = \frac{i_L t_q}{2E\nu\text{arc }\cos\nu} e^{3\pi/4Q} \quad (11)$$

$$L_c = \frac{\nu E t_q}{2i_L \text{arc }\cos\nu} e^{-3\pi/4Q} \quad (12)$$

$$L_i = 7.23 L_c \frac{K+1}{K} e^{3\pi/4Q} \quad (13)$$

where
$i_L$ is the maximum load current,
$t_q$ is the thyristor turn-off time,
E is the source voltage, $\nu$ is the ratio between the maximum load current $i_L$ and the peak commutation current, Q is $$\frac{\sqrt{L_c/C_c}}{R}$$

R is the total resistance of the commutation path, and $K=(I_{LT}-I_L)/I_L$ where $I_{LT}$ is the total current to be commutated and $I_L$ is the average load current.

Many modifications in the above described embodiments of the invention can be carried out without departing from the scope thereof and therefore the scope of the present invention is intended to be limited only by the appended claims.

We claim:

1. In an N-phase inverter having N parallel inverter legs connected across a pair of input lines for connection to a DC source and having isolation inductance means connected to the input lines, wherein each leg includes a pair of thyristors in series, an output terminal between the thyristors, and a diode connected in reverse direction across each thyristor; a commutation circuit for the N legs comprising:
   effective commutating inductance means $L_c$ including a first inductor $L_1$ connected in series with the inverter legs, and a second inductor $L_2$ connected in each of the inverter legs whereby $L_c = L_1 + L_2/N$; and
   commutating capacitance means connected across the effective inductance means and the inverter legs.

2. An N-phase inverter comprising:
   N parallel connected inverter legs connected across input lines for connection to a DC source, each inverter leg including first and second thyristor means connected in series, each of the first and second thyristor means having a diode connected in reverse direction across a thyristor;
   isolation inductance means connected to the input lines; and
   commutating circuit means for the N inverter legs including effective inductance means $L_c$ having a first inductor $L_1$ connected in series between the isolation inductance means and the inverter legs and a second inductor $L_2$ connected in each inverter leg whereby $L_c = L_1 + L_2/N$, and capacitance means in parallel with the effective inductance means and inverter legs for providing a commutation pulse for turning off the thyristors in all of the inverter legs.

3. An inverter as claimed in claim 1 or 2 wherein the isolating inductance means includes an inductor connected in series between the commutation circuit and the DC source and a diode connected in reverse polarity across the inductor.

4. An inverter as claimed in claim 1 or 2 wherein the isolating inductance means includes a first coupling inductor connected in series between the DC source and the commutation circuit and a series connected feedback diode and second coupling inductor connected across the input lines between the DC source and the first coupling inductor, the first and second coupling inductors being magnetically coupled.

* * * * *